US008207435B2

(12) United States Patent
Charles

(10) Patent No.: US 8,207,435 B2
(45) Date of Patent: Jun. 26, 2012

(54) MUSIC TEACHING TOOL FOR STEEL PAN AND DRUM PLAYERS AND ASSOCIATED METHODS

(75) Inventor: Beverley I. Charles, Orlando, FL (US)

(73) Assignee: Pangenuity, LLC, Orlando, FL (US)

( * ) Notice: Subject to any disclaimer, the term of this patent is extended or adjusted under 35 U.S.C. 154(b) by 0 days.

(21) Appl. No.: 12/886,977

(22) Filed: Sep. 21, 2010

(65) Prior Publication Data

US 2011/0107899 A1 May 12, 2011

Related U.S. Application Data

(63) Continuation of application No. 12/346,094, filed on Dec. 30, 2008, now Pat. No. 7,799,983.

(51) Int. Cl.
*G09B 15/02* (2006.01)

(52) U.S. Cl. ...... 84/471 R; 84/470 R; 84/474; 84/483.2; 84/609; 84/615

(58) Field of Classification Search .................... 84/609, 84/471 R, 470 R, 615, 474, 483.2
See application file for complete search history.

(56) References Cited

U.S. PATENT DOCUMENTS

| | | | | |
|---|---|---|---|---|
| 4,277,090 | A | 7/1981 | Lusi | |
| 5,690,496 | A * | 11/1997 | Kennedy | 434/307 R |
| 5,886,273 | A | 3/1999 | Haruyama | |
| 5,973,247 | A | 10/1999 | Matthews | |
| 6,005,180 | A * | 12/1999 | Masuda | 84/622 |
| 6,212,772 | B1 | 4/2001 | Whitmyre et al. | |
| 6,245,982 | B1 * | 6/2001 | Suzuki et al. | 84/477 R |
| 6,555,737 | B2 * | 4/2003 | Miyaki et al. | 84/477 R |
| 6,750,386 | B2 | 6/2004 | King | |
| 6,881,887 | B2 | 4/2005 | Berens | |
| 7,030,305 | B1 | 4/2006 | Cupid | |
| 7,174,510 | B2 | 2/2007 | Salter | |
| 7,241,945 | B1 | 7/2007 | Egan | |
| 7,625,284 | B2 * | 12/2009 | Kay et al. | 463/31 |
| 7,696,421 | B1 | 4/2010 | Charles | |
| 7,799,983 | B2 | 9/2010 | Charles | |
| 7,842,872 | B2 | 11/2010 | Charles | |
| 7,842,877 | B2 | 11/2010 | Charles | |
| 2002/0040633 | A1 * | 4/2002 | Miyaki et al. | 84/477 R |
| 2003/0029302 | A1 | 2/2003 | Reed | |
| 2004/0200338 | A1 | 10/2004 | Pangrle | |
| 2005/0150362 | A1 * | 7/2005 | Uehara | 84/645 |

(Continued)

OTHER PUBLICATIONS

The Pan Page, A forum for the A Steel Pan Instrument, "Steel Pan Tuning, a Handbook for Steel Pan Making and Tuning," [retrieved on Mar. 12, 2009]. Retrieved from the Internet: <http://hotpans.se/pan/tuning/app_a_alto.php>.

(Continued)

*Primary Examiner* — David S. Warren
(74) *Attorney, Agent, or Firm* — GrayRobinson, P.A.; Carl M. Napolitano

(57) ABSTRACT

A tool is provided for assisting in teaching music to a player of a steel pan/drum. The tool comprises a substantially circular base divided into twelve radial sectors, a central sector, and three concentric, radially spaced rings, thereby having 37 elements. Each element bears an indicium representative of a unitary, distinct note name in a range of three consecutive octaves plus a first note in a fourth consecutive octave. Each ring is arranged in so that a counter-clockwise-adjacent note name is separated by an interval of a fifth and a clockwise-adjacent note name is separated by an interval of a fourth.

8 Claims, 11 Drawing Sheets

U.S. PATENT DOCUMENTS

| | | | | |
|---|---|---|---|---|
| 2005/0172780 | A1* | 8/2005 | Masuda | 84/100 |
| 2006/0000340 | A1 | 1/2006 | Barakat | |
| 2006/0107819 | A1* | 5/2006 | Salter | 84/470 R |
| 2006/0174756 | A1 | 8/2006 | Pangrle | |
| 2006/0191398 | A1 | 8/2006 | Sternal | |
| 2008/0072738 | A1 | 3/2008 | Plamondon et al. | |
| 2008/0245212 | A1 | 10/2008 | Lemons | |
| 2008/0289477 | A1 | 11/2008 | Salter | |
| 2008/0289478 | A1 | 11/2008 | Vella | |
| 2008/0314229 | A1 | 12/2008 | Robledo | |
| 2009/0013851 | A1 | 1/2009 | Copeland | |
| 2009/0178537 | A1 | 7/2009 | Kerns et al. | |
| 2009/0178544 | A1* | 7/2009 | Reynolds et al. | 84/610 |
| 2009/0193960 | A1 | 8/2009 | Cookerly | |
| 2009/0223348 | A1 | 9/2009 | Lemons | |
| 2009/0223349 | A1 | 9/2009 | Lemons | |
| 2009/0249941 | A1 | 10/2009 | Lemons | |

OTHER PUBLICATIONS

Mau Mau Music, The "webs" largest source of steel drum sheet music, [retrieved on Mar. 12, 2009]. Retrieved from the Internet: <http://www.maumaumusic.com/proddetail.asp?prod=SDPY%2D7014%2DBirthday%5FParty>.

E.C.S. Steeldrums, [retrieved on Mar. 12, 2009]. Retrieved from the Internet: <http://www.ecs-steeldrums.de>.

Copeland, A Competition of Honors, Steel Bands of the Brooklyn Labor Day Carnival. Aug. 2008 [retrieved on Apr. 7, 2010]. Retrieved from the Internet: <URL: http://www.carnaval.com/newyork/2008/steelbands/> pp. 1-10.

* cited by examiner

MUSIC TEACHING TOOL FOR STEEL PAN AND DRUM PLAYERS AND ASSOCIATED METHODS

CROSS-REFERENCE TO RELATED APPLICATIONS

This application is a continuation of patent application Ser. No. 12/346,094, filed Dec. 30, 2008, now U.S. Pat. No. 7,799,983, the disclosure of which is incorporated by reference hereinto.

FIELD OF INVENTION

The present invention generally relates to music notational systems, and, in particular, to music notation systems and methods for steel pans/drums.

BACKGROUND

The steel pan was created during the late 1930s in Trinidad and Tobago as a rudimentary percussion instrument capable of producing one or two notes not tuned to any particular pitch, and used mainly for rhythm. Since then it has developed into a family of instruments that can form a steel band, made up of a mix of single and multiple pan members that are tuned to concert pitch and together cover a frequency range of some six (6) chromatic octaves (Pan@Dove of the Desert UMC History of the Steel Pan).

Wikipedia, The Free Encyclopedia (www.wikipedia.org/wiki/steelpan), explains that, technically, the steel pan is a pitched percussion instrument, tuned chromatically, made from a drum of the type that stores oil. In fact, "drum" refers to the steel drum container from which the pans are made; the steel drum is correctly called a steel pan or pan, as it falls into the idiophone family of instruments, and is not technically regarded as a drum or membraphone. Steel pans are constructed by pounding the top of the oil drum into a bowl-like shape, known as "sinking" the drum. The drum is tempered over a fire until it is "white hot" and is allowed to cool. Then the notes are laid out, shaped, grooved, and tuned with a variety of hammers and other tools. The note's size corresponds to the pitch; the larger the oval note pad, the lower the tone.

The frequency range of some members of the steel pan family is shown in Table 1.

TABLE 1

Frequency Range of Some Members of the Steel Pan Family

| Instrument | Number of Pans | Frequency Range |
|---|---|---|
| 1. High Tenor | 1 | $D_4$ to $F^{\#}_6$ |
| 2. Low Tenor | 1 | $C_4$ to $E_6$ |
| 3. Double Second | 2 | $F^{\#}_3$ to $D_5$ |
| 4. Double Tenor | 2 | $F_3$ to $A_5$ |
| 5. Double Guitar | 2 | $C_3$ to $G_4$ |
| 6. Triple Cello | 3 | $C_3$ to $B_4$ |
| 7. Four Cello | 4 | $B_2$ to $C_5$ |
| 8. Quadraphonic | 4 | $B_2$ to $D_6$ |
| 9. Tenor Bass | 4 | $F_2$ to $D_4$ |
| 10. Six Bass | 6 | $B^{b}_1$ to $E_3$ |
| 11. Nine Bass | 9 | $A_1$ to $B_3$ |

The steel pan is currently enjoying tremendous popularity and acceptance as a valid art form on every continent and in almost every country, including the United States, United Kingdom, and continental Europe, Africa, Australia, the Caribbean states, China, and Japan. However, the advances in design and popularity have not been accompanied by a matching development in music writing ability. The vast majority of pan players continue to learn by rote, because they have little or no formal training in music. Thus, it takes a long time to master a piece, and the player quite often cannot recall what was learned from long hours of practice because the music has not been documented in a form that can be used as a reference. Further, while music is being generated by pan musicians, they do not yet have a means of writing it down (P. Bishop, *Pan in Education,* 2004, www.ecaroh.com/pan/steelpaneducation.htm).

A tablature system would permit preservation and critical study. This lack of music notation restricts the opportunities for composers/arrangers to transmit ideas except via face-to-face demonstration or instruction. It also affects their ability to archive their musical ideas as they occur, and retrieve them when necessary. The result is that much of the music is remembered only in part or is lost forever, and a significant amount of time is wasted during practice sessions while composers/arrangers attempt to create music "on the fly."

At present, some musical scores are available as audio (wave) files and/or digital recordings accompanied by sheet music in standard notation. However, while standard notation tells the trained musician everything there is to know about the music to be played, it provides no visual clues to the untrained pan player about how and where to find the correct note and pitch on the pan.

Steel pan players typically know about sharps, flats, key signatures, time signatures, scales, chords, octaves, and the like, and they know the note names (e.g., C, $E^b$, $G^{\#}$, B, $F^{\#}$, $B^b$, etc.), but many have not fully developed the ability to decipher the symbols of standard notation. Consequently, instruction by an arranger, musical director, or section leader is mostly verbal, using note names, and by practical demonstration. These shortcomings notwithstanding, the process has produced magnificent performances of popular and classical music, even though many of the most highly accomplished and internationally renowned exponents of the art form have learned the music by rote.

Some existing systems attempt to add "note names" to sheet music in standard notation. However, even with these aids, untrained musicians still have difficulty determining pitch, and pan players are frequently unable to associate the notes indicated in standard notation with a physical location on the instrument.

Thus, what is missing is the capacity to score music in a form that is understandable to trained and untrained musicians alike, and to provide hard copy for archival purposes. This absence of a common musical language restricts opportunities for fruitful collaboration between pan players, and between pan players and other musicians.

Standard musical notation is geared to the piano. It is written on, below, and above two five-line staffs starting with the lowest notes on the bottom left and continuing upward to represent the notes in the chromatic scales $A_o$ to $C_7$, following the arrangement of notes on the standard piano keyboard. The "grand staff" has the lower notes associated with the bass clef, generally intended to be played with the left hand, and the higher notes associated with the treble clef, generally intended to be played with the right hand.

Various systems of tablature have been developed over the centuries for string or plucked instruments. In the case of the six-string guitar, the system of tablature (TAB) uses a six-line staff to represent the guitar fretboard on which pitch increases as one moves from fret #1 to fret #12. Fret numbers are entered on the staff to tell the guitar player where to stop which strings, in which combinations, and in what sequence, to produce the desired music.

By themselves, and in their present form, none of these systems provides a complete answer for the pan player. It would therefore be desirable to provide a tablature system and method of use for steel pan music.

SUMMARY OF THE INVENTION

The present invention is directed to a system that is intuitive and easy for pan players to understand and apply, and that allows composers/arrangers to create, edit, and archive pan music by combining note names with a new musical staff derived from the physical characteristics of the instruments in the steel pan family.

The pan tablature (pan tab) system displays pan tab notation, with or without also displaying the equivalent standard notation; permits the creation of sheet music for archiving musical scores and supplementing learning by rote; makes pan players more familiar with the rudiments of standard notation and develop the desire to pursue formal musical training; and facilitates and encourages greater collaboration between pan players and other musicians.

A particular embodiment of the invention is directed to a tablature system for representing a series of notes to be played on a steel pan/drum having a plurality of concentric rings of note pads, wherein each note pad is capable of producing a distinct musical pitch when struck. The tablature system comprises a staff having three horizontal lines positioned atop, and in spaced relation from, each other, a first line representing a center ring of note pads, a second line positioned above the first line representing an inner ring of note pads, and a third line positioned above the second line representing an outer ring of note pads. In an alternate embodiment, this order can be reversed.

For each note pad to be represented, a rhythmic indicator is provided that is positioned adjacent the horizontal line commensurate with the ring on which the note pad to be represented lies. For each note pad to be represented, a note name is provided that corresponds to the note pad to be represented, the note name adjacent the respective rhythmic indicator.

The tablature system can also be used to represent a series of notes to be played on a bass pan set, wherein each pan has a plurality of note pads, each note pad capable of producing a distinct musical pitch when struck. The tablature system again comprises a pan staff having three horizontal staff lines positioned atop, and in spaced relation from, each other. Here a first staff line represents the first of three pads on each pan, a second staff line positioned above the first staff line represents the second of the three pads on each pan, and a third staff line positioned above the second staff line represents the third of the three pads on each pan.

The rhythmic indicator and note name placement are as above.

Also contemplated by the present invention is a device for entering and editing representations of a series of notes to be played on a steel pan/drum, for printing sheet music in the tablature of the invention, and for providing midi or other electronic output for use with third-party music notation software. The device comprises a processor, a display, and an input and an output device in signal communication with the processor.

Software is resident on the processor, or can be introduced thereonto via a computer-readable medium, that has code segments adapted to display a representation of a steel pan having a plurality of concentric rings of note pads, or of a bass pan set as described above. A user selection can be received via the input of a series of notes to be played on the steel pan(s). The user-selected note series can be displayed on the display, used to create sheet music in the tablature of the invention, and produce midi or other electronic output for other use with third-party music notation software as described above.

Another aspect of the present invention is directed to a tool for assisting in teaching music to a player of a steel pan/drum. The tool comprises a substantially circular base divided into twelve radial sectors, a central sector, and three concentric, radially spaced rings, thereby having 37 elements. Each element bears an indicium representative of a unitary, distinct note name in a range of three consecutive octaves plus a first note in a fourth consecutive octave. Each ring is arranged so that a counter-clockwise-adjacent note name is separated by an interval of a fifth and a clockwise-adjacent note name is separated by an interval of a fourth.

A further aspect of the present invention is directed to a four-octave double soprano steel pan set. The double soprano pan set comprises a first pan and a second pan. Each pan is divided into three concentric rings and six radial sectors. An outermost of the three rings is further radially divided into two portions, to form twenty-four note pads. Each note pad is adapted to produce a distinct musical pitch when struck. Each of the radial sectors has four note pads therein, the four note pads in each of the radial sectors in octave relation to each other. Thus the twelve total radial sectors of the first and the second pan contain the notes sufficient to span four octaves.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3E includes representations of rhythmic indicators of the pan tab notation.

DETAILED DESCRIPTION OF THE PREFERRED EMBODIMENT

A description of the preferred embodiments of the present invention will now be presented with reference to FIGS. 1-13.

The pan tablature (pan tab) system is derived from the physical characteristics of the pan, and the arrangement of notes on the playing surface. Two exemplary pan arrangements are illustrated in FIGS. 1 and 2.

Figure 1:
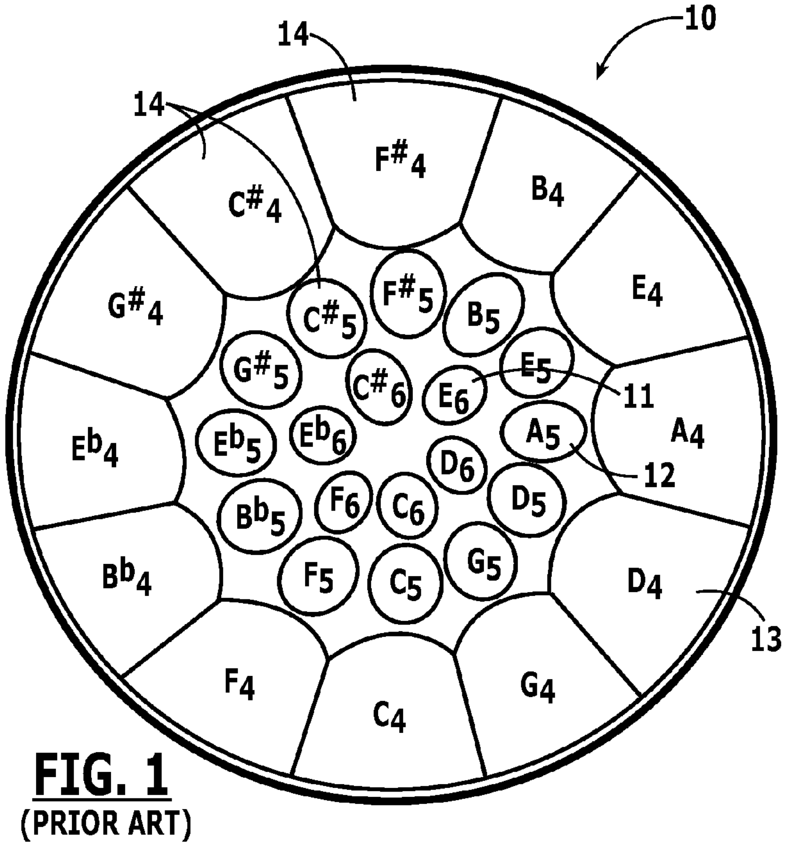
FIG. 1 (PRIOR ART)
FIG. 1 (prior art) illustrates the layout of a low tenor pan.

In FIG. 1 a low tenor pan layout 10 is illustrated as having three concentric rings 11-13 of note pads 14, wherein each note pad 14 is capable of producing a distinct musical pitch when struck. In this arrangement, a center ring 11 of note pads 14 containing the notes $C_6$ through $F_6$; an inner ring 12 containing the notes $C_5$ through $B_5$; and an outer ring 13 containing the notes $C_4$ through $B_4$. Lower notes are represented toward the outside, since they require greater surface area.

Figure 2:
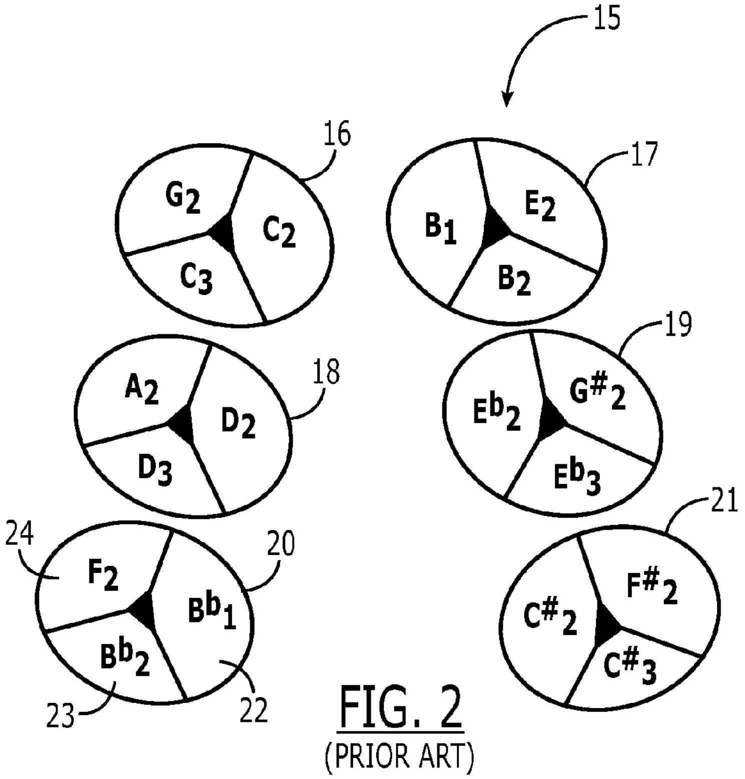
FIG. 2 (PRIOR ART)
FIG. 2 (prior art) illustrates the layout of a six-bass pan set.

In FIG. 2 a six-bass pan set 15 is illustrated, comprising six pans 16-21. Each pan 16-21 has three note pads, each representing a different pitch value ranging from $B^b{}_1$ through $E^b{}_3$. Generally, each pan 16-21 will contain a first note pad 22 capable of producing a first musical pitch when struck, a second pad 23 capable of producing a second musical pitch an octave above the first musical pitch when struck, and a third pad 24 capable of producing a third musical pitch intermediate between the first and the second musical pitch when struck. The third musical pitch is typically a fourth or fifth between the octave pair.

In this arrangement, the first note pads 22 range chromatically from $B^b{}_1$ through $E^b{}_2$; the second note pads 23 range chromatically from $B^b{}_2$ through $E^b{}_3$; and the third note pads 23 range chromatically from $E_2$ through $A_2$. It will be understood by one of skill in the art that variations on these layouts can occur, and that the present invention is not intended to be limited to the particular arrangement illustrated and described herein.

Four exemplary sequences 30,230;31,231 of music notated in the tablature systems of the present invention are displayed in FIGS. 3A-3D. The sequences 30,230 can be used with a tenor pan such as illustrated in FIG. 1, although this is not intended as limiting, and can be used with any multi-ring pan.

Figure 3A:
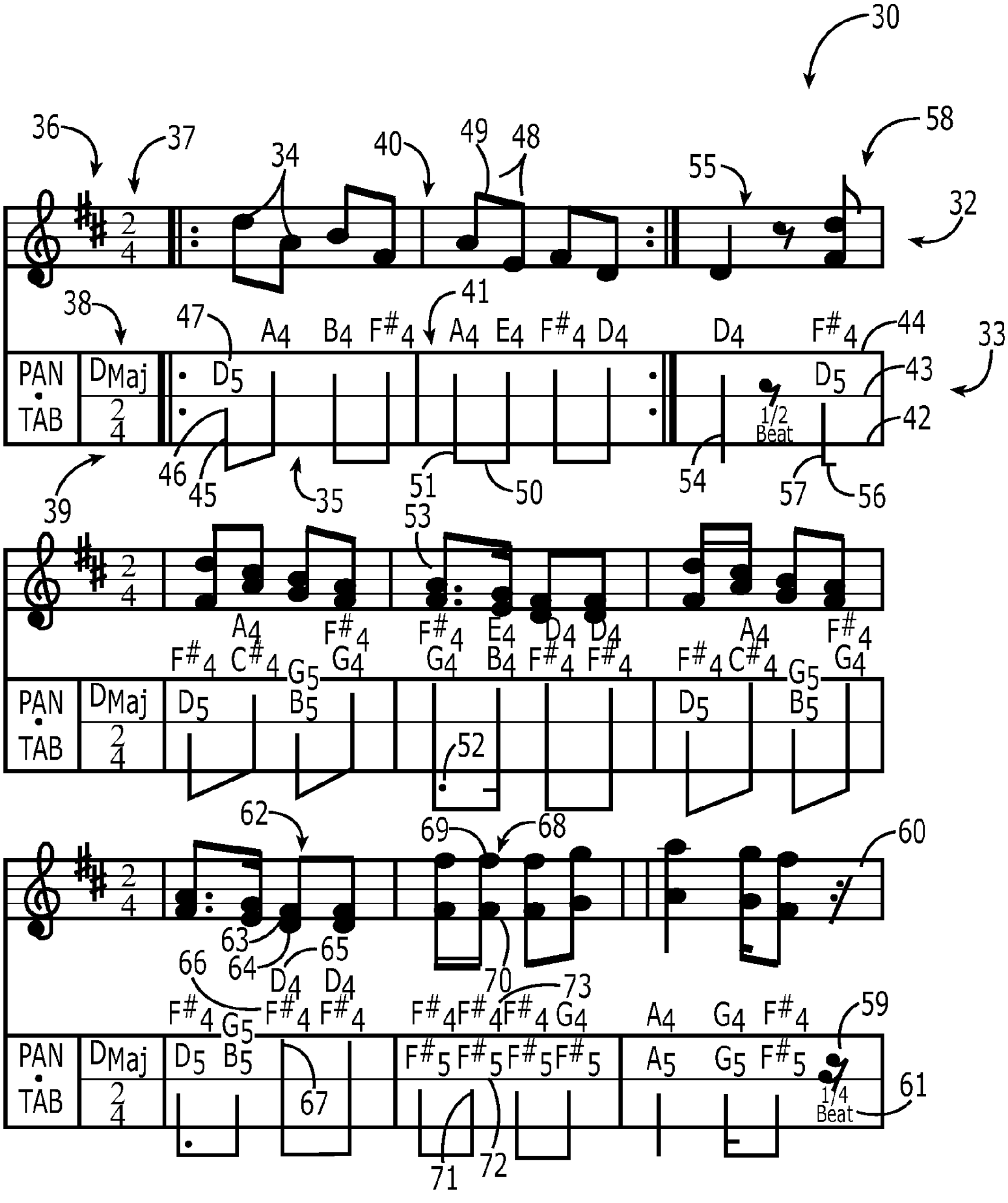
FIGS. 3A-3E are examples of the pan tab notation of the present invention for use with steel pans/drums containing a plurality of concentric rings of note pads (FIGS. 3A and 3B) and with bass pan sets (FIGS. 3C and 3C).
Figure 3B:
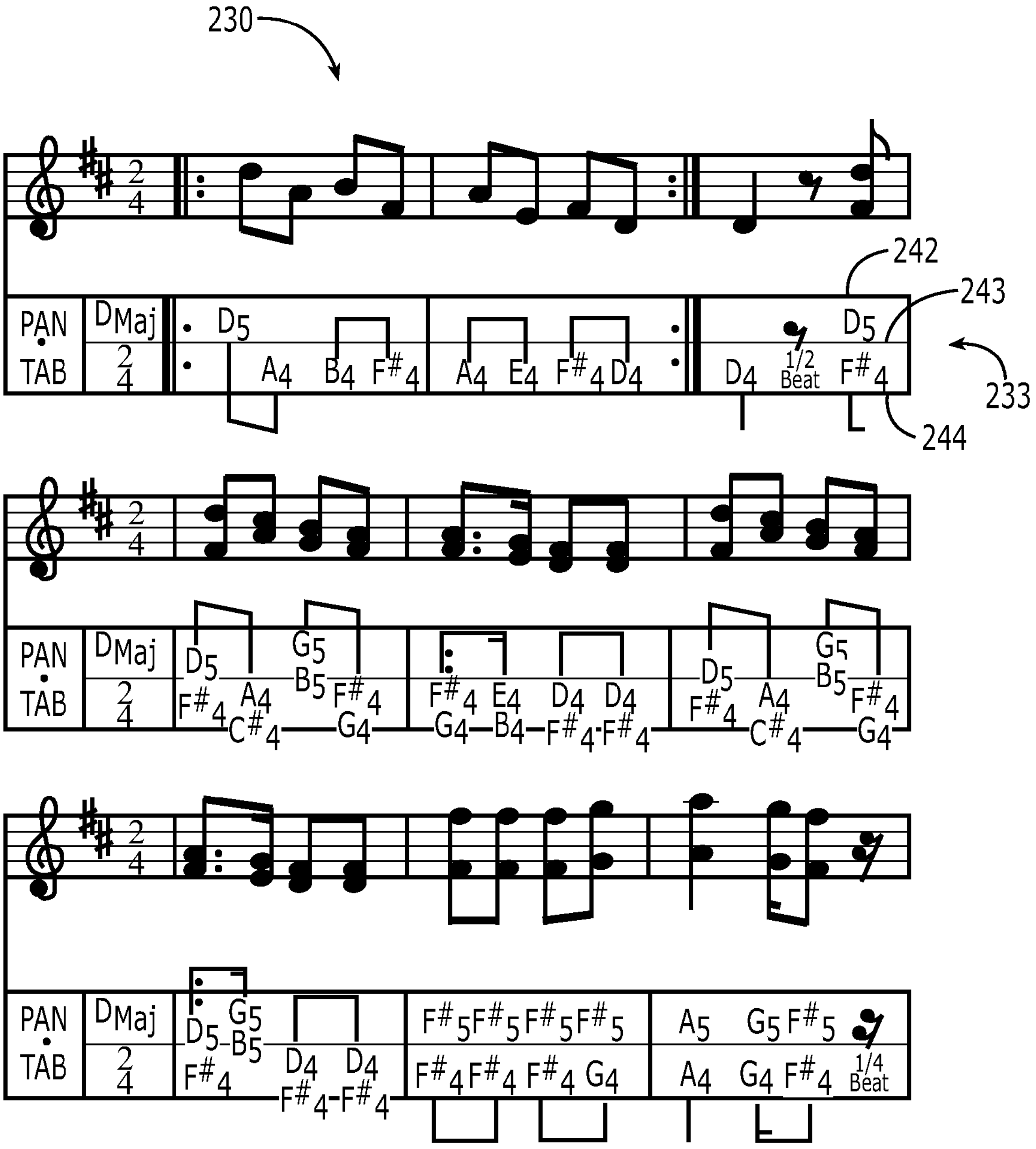

In the embodiment 30 of FIG. 3A, a G-clef staff system 32 such as known in the art of musical notation is positioned atop a pan staff 33 of the present invention. The G-clef staff system 32 is populated by the series of notes 34 to be played. The pan staff 33 comprises, prior to a first measure of music 35, and beneath the key 36 and time 37 signatures of the G-clef staff system 32, a letter representation ("key name") 38 of the key signature and the time signature 39. Measure lines 40,41 as known in the art are present in both staff systems 32,33.

The pan staff 33 has three horizontal lines 42-44 positioned atop, and in spaced relation from, each other. A first (bottom) line 42 represents the center ring 11 of note pads 14; a second (middle) line 43 positioned above the first line 42 represents the inner ring 12 of note pads 14; and a third (top) line 44 positioned above the second line 43 represents the outer ring 13 of note pads 14.

In this example, for each note pad 14 to be represented, a vertical stem line 45 is provided that has a top end 46 that terminates adjacent the horizontal line 42-44 commensurate with the ring 11-13 on which the note pad 14 to be represented lies. For each note pad 14 to be represented, a note name 47 is provided that corresponds to the note pad 14 to be represented, the note name 47 positioned above the respective stem line 45. Each note pad 14 represented on the pan staff 33 is positioned in vertical alignment with its corresponding note 34 in the G-clef staff 32 musical notation.

Additional notational features are similar to those used in standard musical notation. For example, for adjacent eighth notes 48 to be beamed 49 together, a beam 50 extends between bottom ends 51 of the corresponding stem lines 45. A dot 52 is placed adjacent a bottom end 51 of the stem line 45 for representing a dotted rhythm 53. A unitary stem line 54 can be used to represent a quarter note 55, and a horizontal line 56 adjacent a bottom end 57 of the stem line 54 can be used to represent an eighth note 58 rhythm. A symbol 59 representative of a rest 60, and corresponding to standard musical notation, can additionally be used, wherein each symbol 59 is accompanied by verbiage 61 that defines the meaning of the symbol 59. A list of rhythmic indicators is provided on FIG. 3E, including additional symbols for whole notes, comprising the note name 47 in a circle 250; half notes, comprising the note name 47 in a circle 251 with a stem line 252 depending therefrom; and a triplet designation 253, with the note names 47 beneath the stem lines 254.

The pan staff 33 further permits the representation of chords (multiple note pads 14 struck simultaneously). In one case a chord 62 comprises two notes 63,64 to be played simultaneously wherein the two notes 63,64 correspond to two note pads 14 on a common ring 11-13. Here the two note names 66,65 corresponding to the two note pads 14 to be represented are positioned in stacked relation above the respective stem line's top end 67. In another case a chord 68 comprises two notes 69,70 that correspond to two note pads 14 on different rings 11-13. Here the vertical stem line's top end 71 terminates adjacent the lower staff line 43 to be populated between the two notes, and the note names 72,73 corresponding to the two note pads 14 to be represented are positioned in stacked relation, each note name 72,73 above the respective staff 43,44.

An alternate mode 230 (FIG. 3B) of representation is substantially the reverse of that 30 above. Here, the pan staff 233 has three horizontal lines 242-244 positioned atop, and in spaced relation from, each other. A first (top) line 242 represents the center ring 11 of note pads 14; a second (middle) line 243 positioned below the first line 242 represents the inner ring 12 of note pads 14; and a third (bottom) line 244 positioned below the second line 243 represents the outer ring 13 of note pads 14. The remaining notational details remain substantially the same.

Figure 3C:
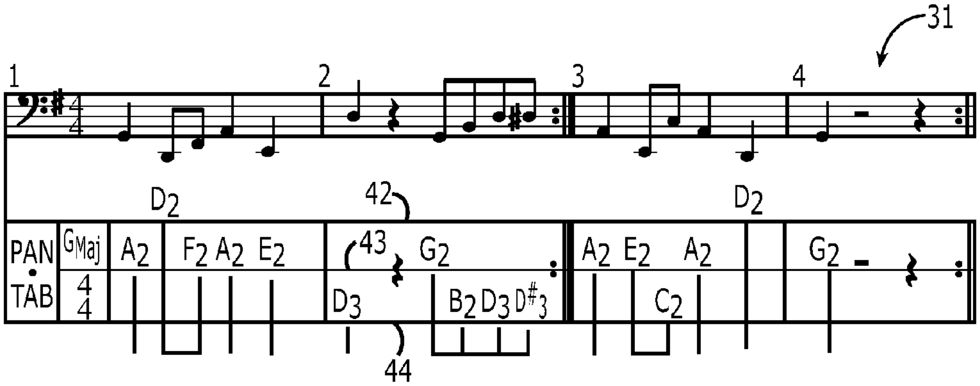
Figure 3D:
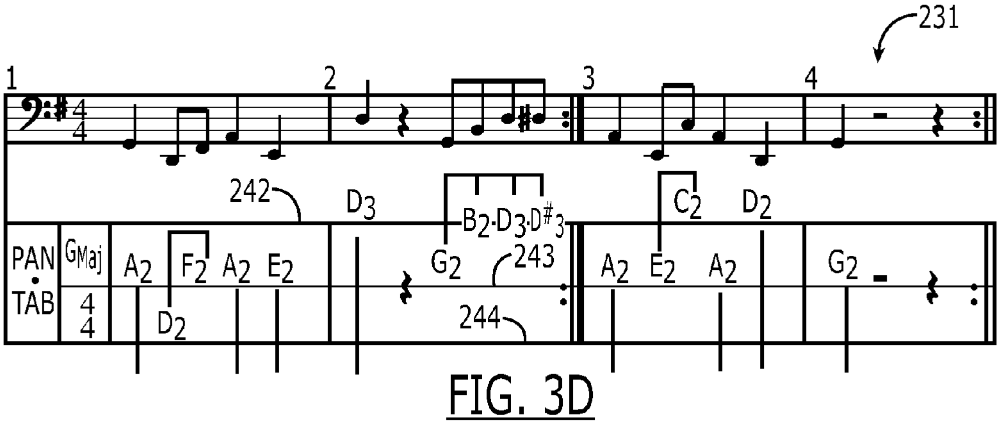
Figure 3E:
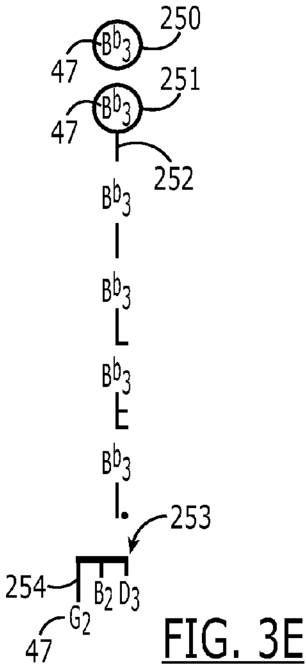
Figure 4:
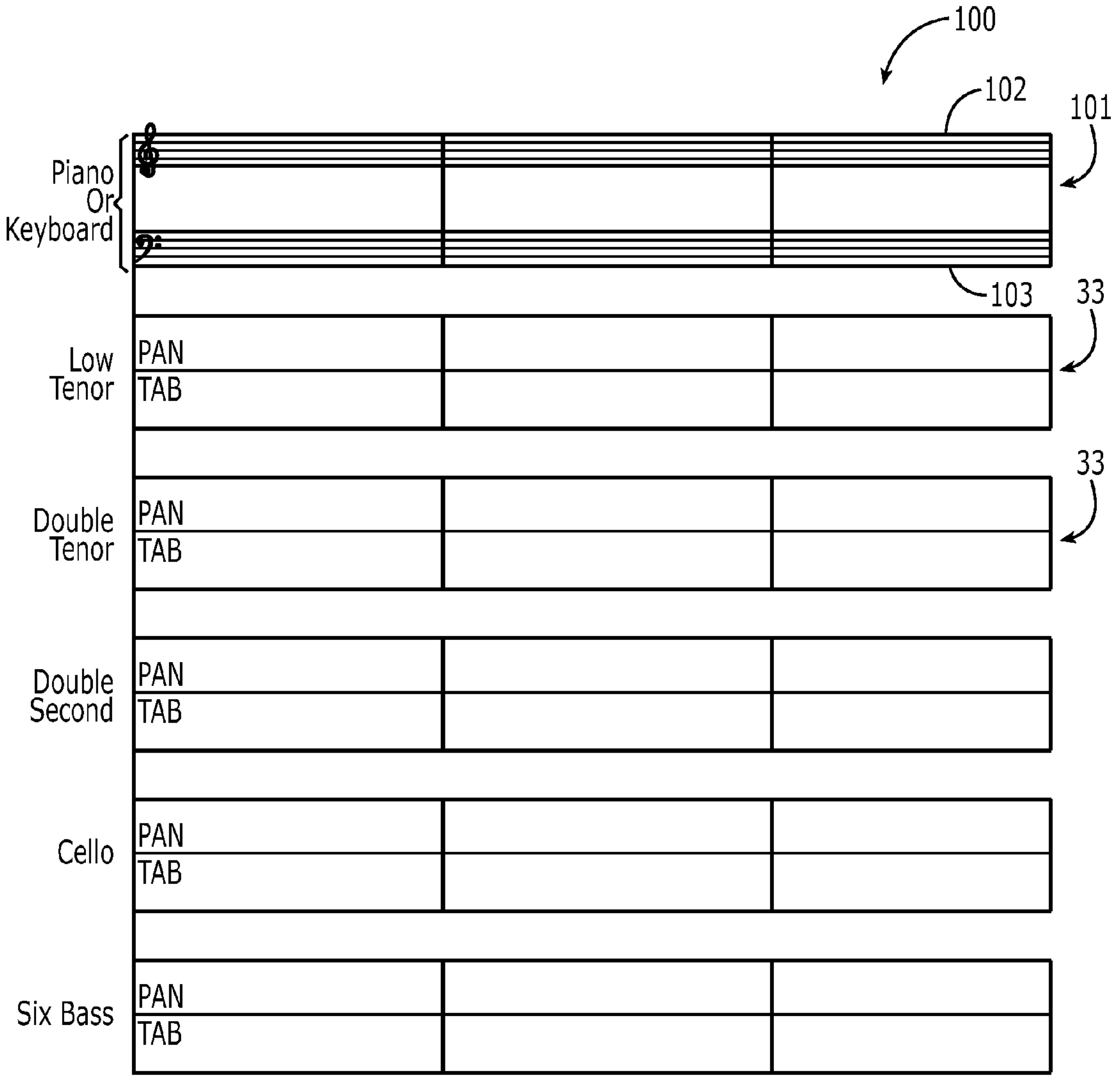
FIG. 4 illustrates an exemplary orchestral pan tab score format.
Figure 5:
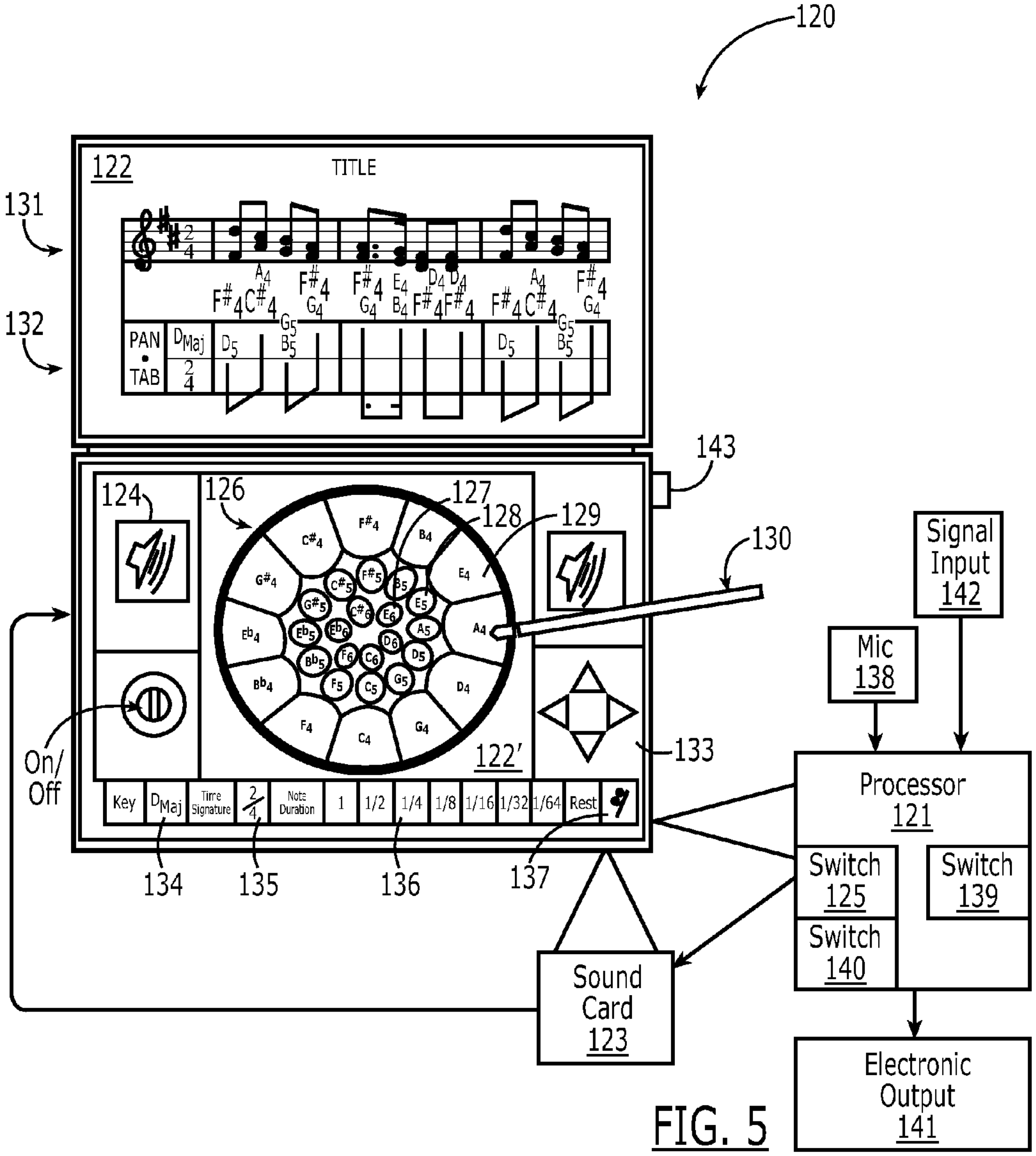
FIG. 5 is a top plan view of a device for entering, editing, and outputting music in the tablature of the present invention.

A sequence 31 for a bass pan set, for example, a six-bass pan set 15 adapted for playing a chromatic series of 18 notes such as shown in FIG. 2 is illustrated in FIG. 3C. In this variation of the tablature system, the same pan staff comprising three horizontal staff lines 42-44 is provided, each staff line 42-44 for representing a set of note pads in chromatic sequence. Here the first (top) staff line 42 represents a sequence of six notes from $B^b{}_1$ through $E^b{}_2$; the second (middle) staff line 43 represents a sequence of six notes from $B^b{}_2$ through $E^b{}_3$, that is, an octave up from those on the top staff line 42; the third (bottom) staff line 44 represents a sequence of six notes from $E_2$ through $A_2$.

Again, as above, for each note pad to be represented, a rhythmic indicator is positioned adjacent the staff line in the set of which the note pad belongs, and for each note pad to be represented, a note name corresponding to the note pad to be represented is positioned adjacent the respective rhythmic indicator.

In an alternate embodiment 231 of the invention, usable for a bass pan set 15 such as illustrated in FIG. 2, the staff lines 242-244 represent notes in pitch order. The first (top) line 242 represents a sequence of six notes from $B^b_2$ through $E^b_3$; the second (middle) staff line 243 represents a sequence of six notes from $E_2$ through $A_2$; and the third (bottom) line 244 represents a sequence of six notes from $B^b_1$ through $E^b_2$.

It will be understood by one of skill in the art that any configuration of one or more pans can be accommodated with the notation of the present invention, simply by defining a set of notes to be represented on each staff line and creating scores based upon that definition, and that the invention is not intended to be limited to these particular exemplary embodiments.

An orchestral score format 100 (FIG. 4) can also be contemplated, wherein a plurality of stacked pan staffs 33 are provided, one for each of the types of pans or pan systems. Again, a standard keyboard staff 101 is provided, comprising a G-102 and an F-clef 103 staff.

Another aspect of the present invention is directed to a system, device, and method for entering and editing representations of a series of notes to be played on a steel pan/drum (FIG. 5), and for printing music sheets using the tablature system as described above. In a particular embodiment, the device 120 comprises a processor 121, a display, and input and output devices in signal communication with the processor 121. Preferably the display is segmented into two areas, a first 122 comprising a top, display-only portion and a second 122' comprising a bottom, display and touch screen portion serving as an input. The device 120 preferably further comprises a sound card 123 and speakers 124 that are in signal communication with the processor 121. Alternatively, the device 120 can output a signal via an output jack 143 for being played through a headset or into a digital recording device, for example.

Software 125 can be resident on, or introduced onto, the processor 121 that has code segments adapted to display a representation 126 of any steel pan, such as that having three concentric rings 127-129 as discussed above, or other plurality of concentric rings, or of a bass pan set as described above, or any other configuration of steel pan. A user selection can be received via the touch screen 122 using a stylus 130 of a series of notes 131 to be played on the steel pan(s). The user-selected note series 131 can be displayed on the display device with a tablature system 132, for example, in concert with the series as described above, and can also be played through the speakers 124. Other input elements such as known in the art can also be included, such as direction buttons 133, key indicators 134, time signature indicators 135, note duration indicators 136, and rest indicators 137.

Other methods of entering a series of notes into the processor 121 can include using a microphone 138 to capture an audio file and providing software 139 resident on, or introduced onto, the processor 121 for directly translating the audio file into the tablature system 132 of the present invention. In other embodiments, software 140 could be provided that could read an input scanned file of standard musical notation and convert the scanned file into the tablature 132 of the present invention.

Additionally, MIDI or other electronic output files can be provided via an output device 141 for use, for example, with third-party music notation software. Further, a signal input 142 in signal communication with the processor 121 can be used to introduce music files to the processor 121 for displaying, editing, and playing. Such a feature permits composers and arrangers the freedom to create and edit scores using the elements of the present invention in means known in the art, on site or remote from a particular practice or performance setting.

Figure 6:
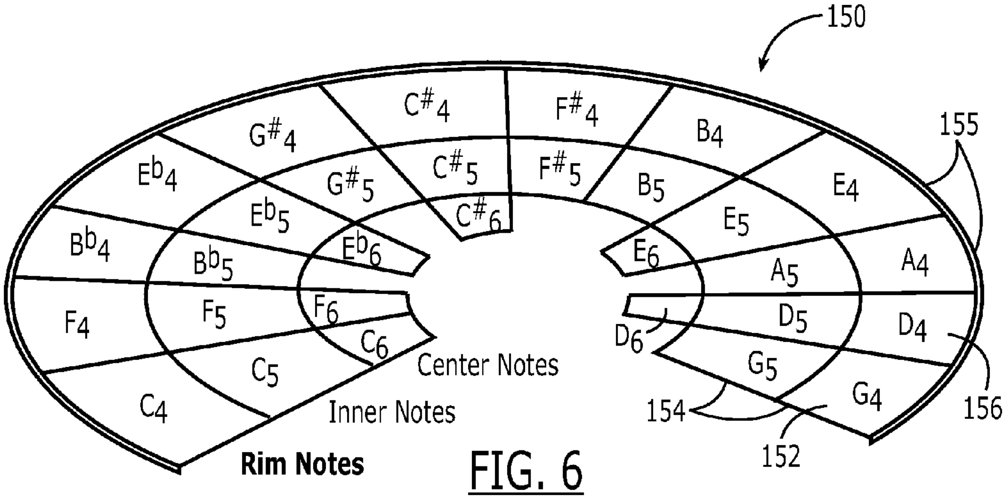
FIG. 6 is a tear-away view of a low tenor pan representing a MIDI keyboard with notes in drum order.
Figure 7:
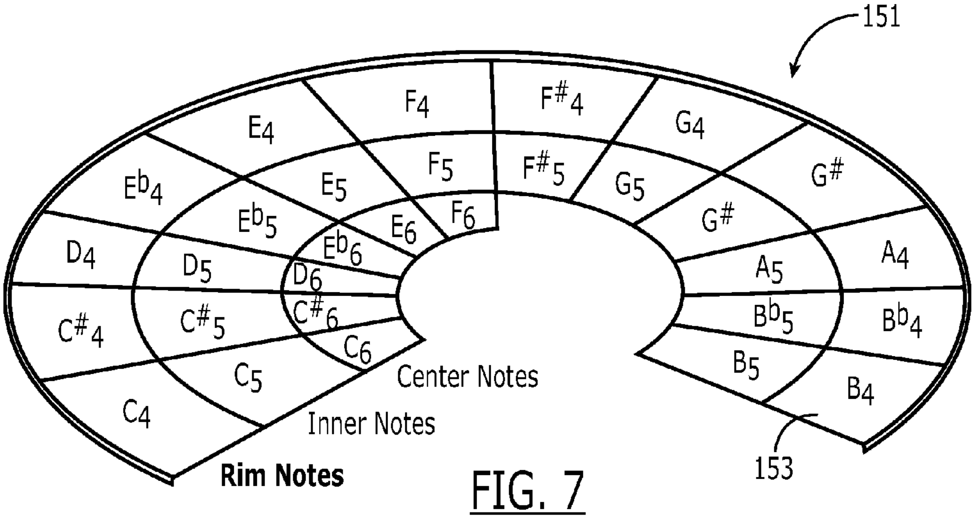
FIG. 7 is a tear-away view of a low tenor pan representing a MIDI keyboard with notes in chromatic order.

Other input means may also be envisaged in the present invention. For example, views of pans 150,151 such as in FIGS. 6 and 7 illustrate a note palette for any instrument in the pan family, and resemble a keyboard when viewed thus. In this embodiment, the representations 150,151 each comprise a toroidal section divided into a plurality of annular sectors 154, and the annular sectors 154 are divided into a plurality of radial sectors 155. Each sector contains a note name indicium 156. A range of the note name indicia 156 comprising note names in a range corresponding to a note range of a steel pan being represented. The note pads 152 can appear in drum order (FIG. 6), as they appear on the actual instrument, or they can appear in chromatic order 153 (FIG. 7).

Figure 8:
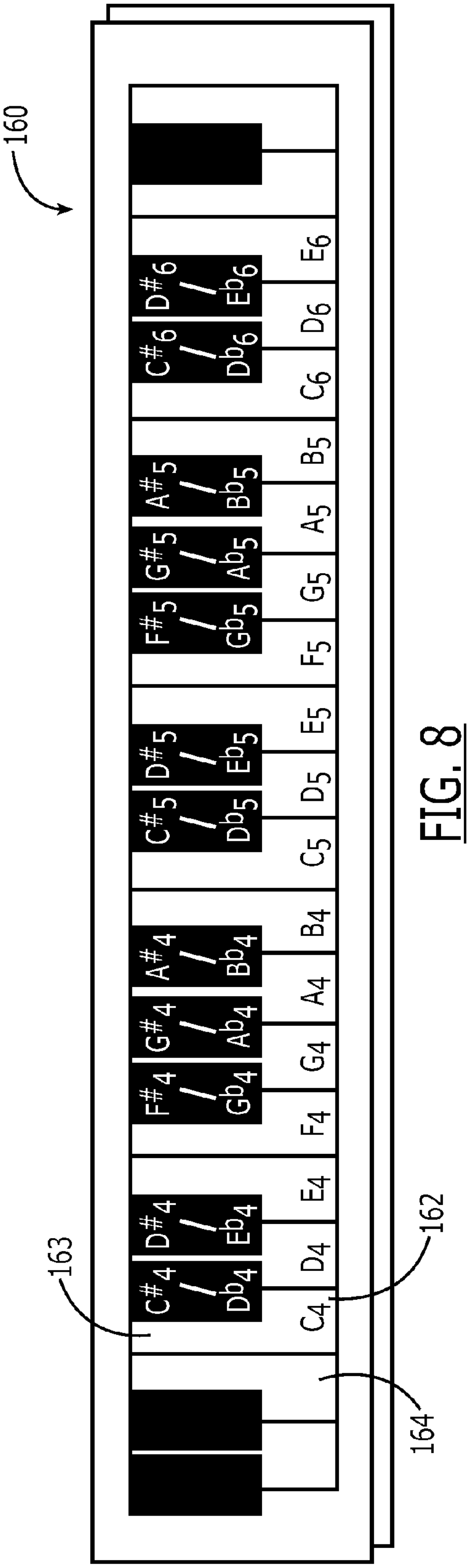
FIG. 8 is an image of a virtual MIDI keyboard with a low tenor pan mask.
Figure 9:
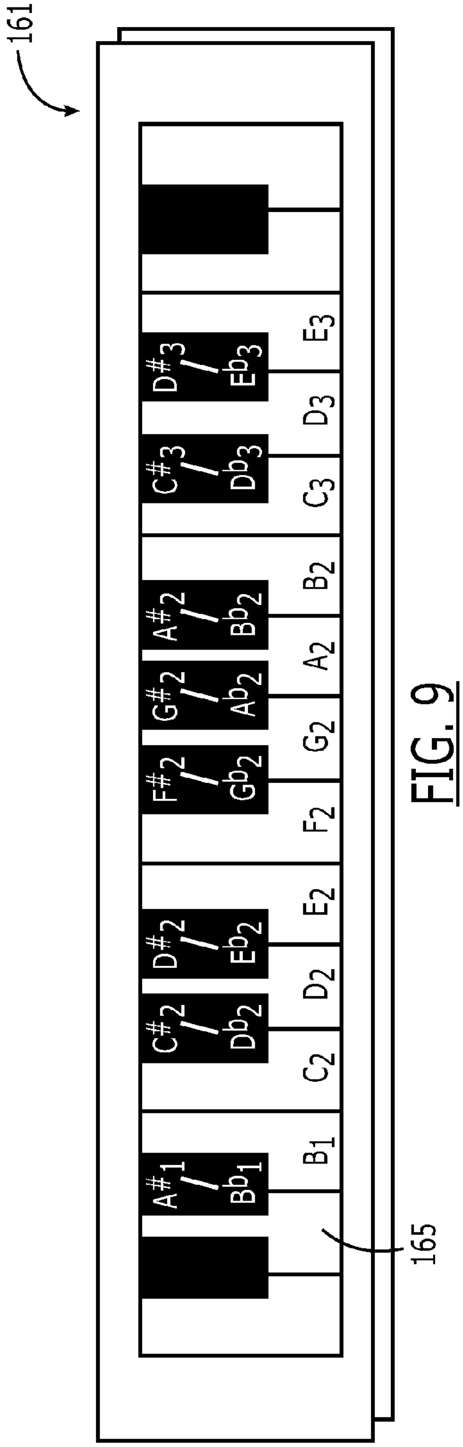
FIG. 9 is an image of a virtual MIDI keyboard with a six-bass pan set mask.

An input means can include a virtual keyboard 160,161 such as illustrated in FIGS. 8 and 9. Here the note names 162 are provided on the key images 163, and a "mask" 164,165 covers that part of the keyboard 160,161 that is outside the range of the instrument being represented. For example, the mask 164 in FIG. 8 for the low tenor pan only permits entry in the note range $C_4$ through $E_6$. The mask 165 in FIG. 9 for the six-bass pan set only permits entry in the range $B^b_1$ to $E_3$.

The system also permits the printing of sheet music in the tablature of the invention, and further provide MIDI or other electronic output for use, for example, with third-party music notation software.

Figure 10:
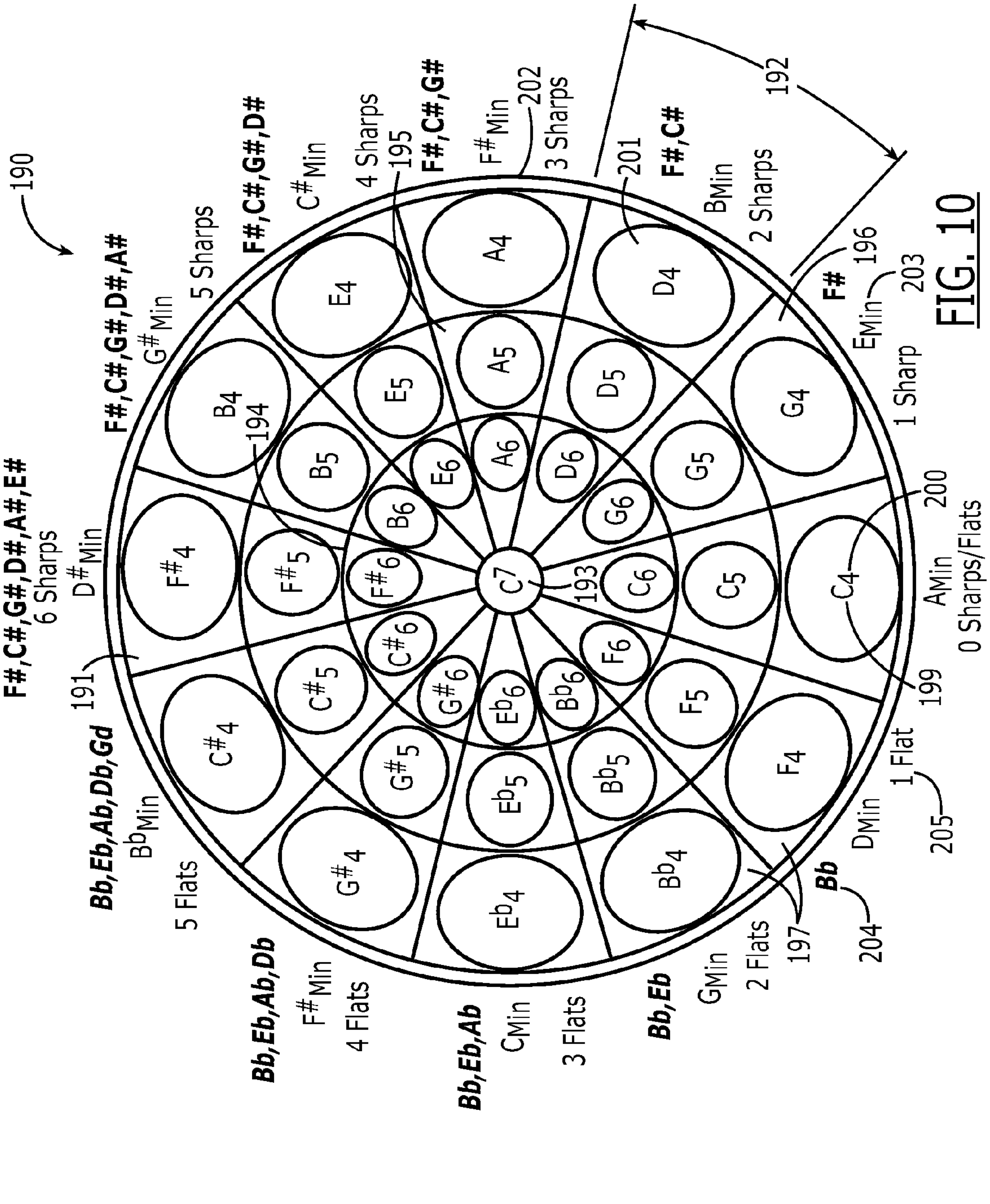
FIG. 10 is a schematic diagram of a 37-note fourths and fifths music teaching tool.

Another aspect of the present invention is directed to the establishment of a "37-note fourths and fifths" music teaching tool 190 (FIG. 10). The tool 190, which can comprise a physical entity or an electronic display, comprises a substantially circular base 191 that is divided into twelve radial sectors 192, a central sector 193, and three concentric, radially spaced rings 194-196. These divisions thereby create 37 elements 197. Each element 198 bears an indicium representative of a unitary, distinct note name comprising a letter indicator 199 (e.g., C) and a numerical octave indicator 200 (e.g., a subscript "4"). The 37 elements 198 thereby represent a range including three consecutive octaves of notes, plus a first note in a fourth consecutive octave. The elements 198 are in this embodiment enclosed in an oval-shaped indicium 201.

In this particular embodiment, each ring 194-196 represents one octave, with the outermost ring 196 having the lowest octave (here, "4"), the middle ring 195 has the next-highest octave (here, "5"), the innermost ring 194 has the next-highest octave (here, "6"), and the central sector 193 indicium represents the first note in the next-highest octave, which is the highest note in the range (here, $C_7$).

Each ring 194-196 is arranged so that an adjacent note name in a first radial direction, here, counter-clockwise, is separated by an interval of a fifth and an adjacent note name in a second radial direction opposite the first radial direction, here, clockwise, is separated by an interval of a fourth, as in the so-called "cycle of fifths" known in the art.

The tool 190 further comprises additional indicia positioned external a periphery 202 of the base 191 and adjacent an element 198 of the outermost ring 196. Twelve indicia 203 indicate a relative minor key of a key represented by a note name in the adjacent element. Twelve indicia 204 also indicate a set of one or more accidentals (e.g., "$B^b$"; or, in the key of C, none) in a key represented by the note name 199,200 in the adjacent element 198. Twelve indicia 205 further indicate a number and type of accidentals in the key represented by the adjacent note name 199,200 (e.g., "2 Sharps"; for the key of C, there is an indication of "0 Sharps/Flats").

The tool 190 can be useful for teaching music, since octaves are radially adjacent, and scales can be played using common subscripts, moving clockwise or counter-clockwise depending upon whether one wishes to proceed in descending or ascending order. Key signatures are also easily learned, associating the keys with each note pad. The relative minor can also be found by moving three notes counter-clockwise from the note name of the major key. Chord structure can also be taught by illustrating, for example, the positioning of triads.

Figure 11:
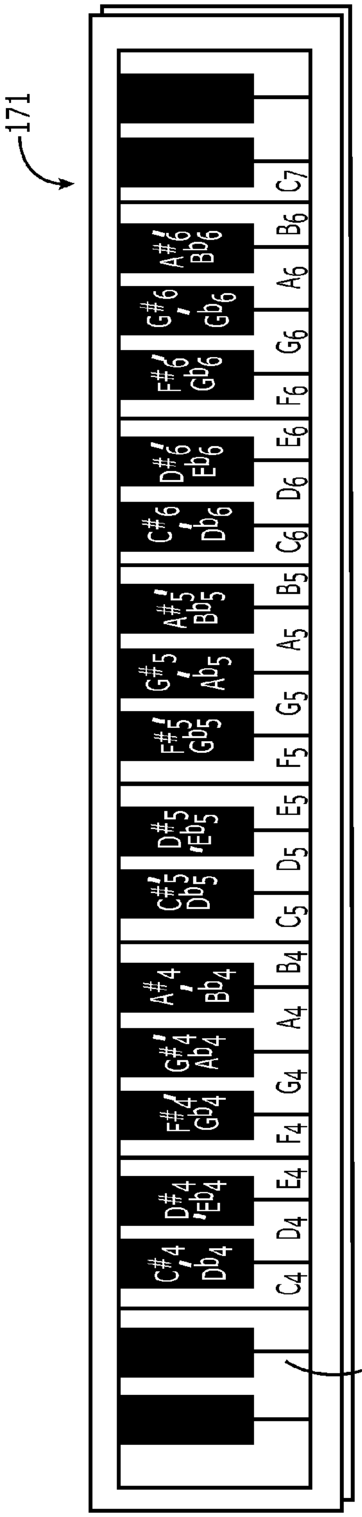
FIG. 11 is an image of a virtual MIDI keyboard with a 37-note fourths and fifths music teaching tool mask.

A corresponding virtual MIDI keyboard representation 171 is illustrated in FIG. 11, showing the same range of $C_4$ through $C_7$, and a mask 172 "covering" the remaining keys.

In another embodiment, the arrangement of notes in the music teaching tool can be reversed to allow the playing of scales in descending order by moving counter-clockwise, and in ascending order by moving clockwise.

Figure 12:
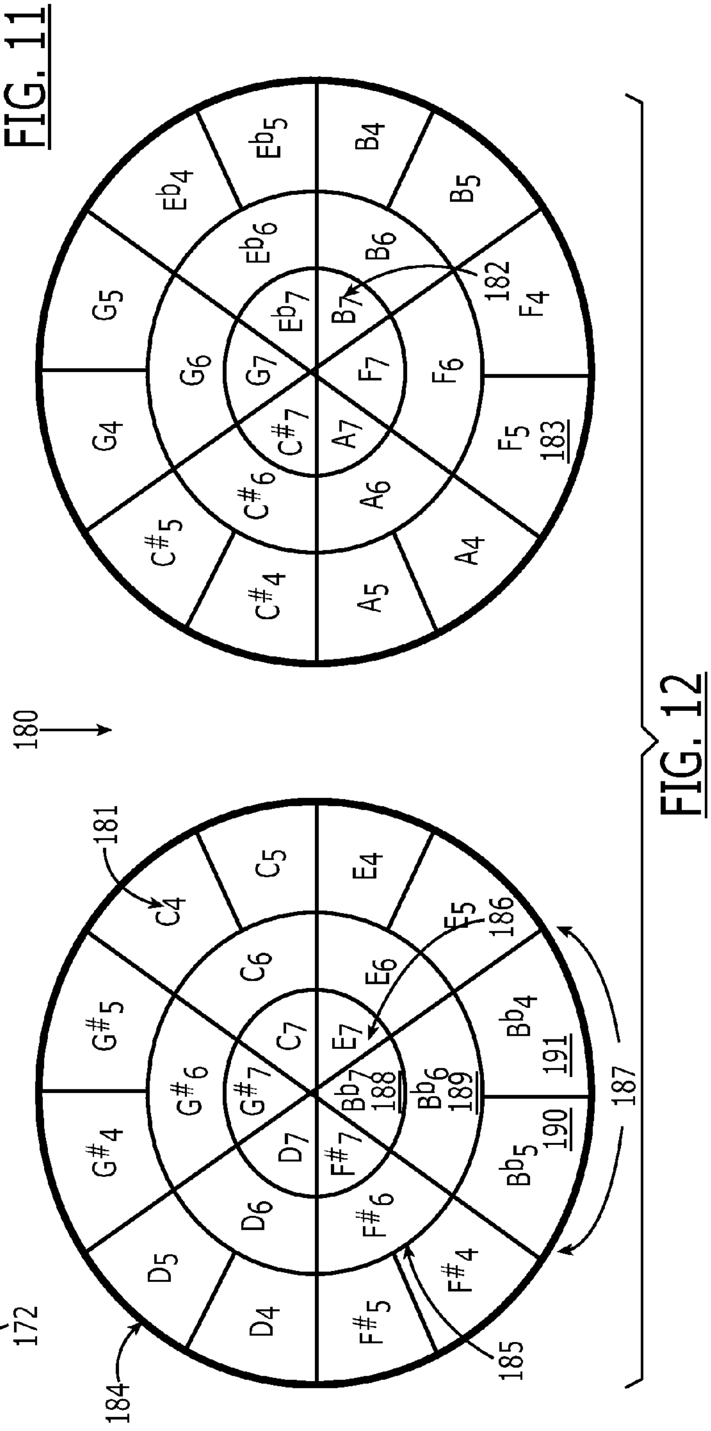
FIG. 12 illustrates a layout for a double soprano pan set.
Figure 13:
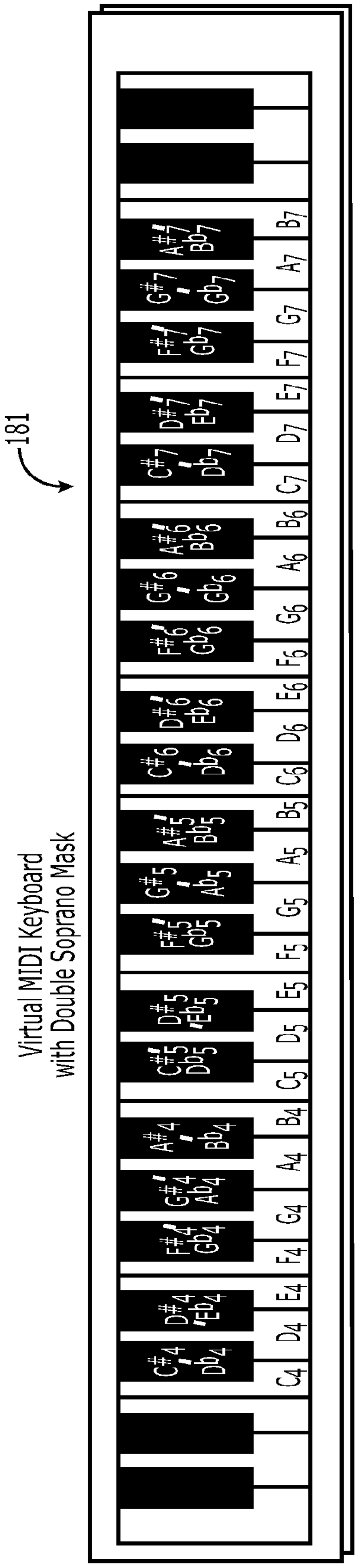
FIG. 13 is an image of a virtual MIDI keyboard with a double soprano mask.

Yet a further aspect of the present invention contemplates a four-octave double soprano pan set 180 (FIG. 12). In this set, the pitches range from a lowest note 181 ($C_4$) through a highest note 182 ($B_7$). Each pan contains 24 note pads 183 arranged in three concentric rings 184,186. Each pan is further arranged in six radial sectors 187 of 60 degrees each. Each sector 187 comprises a center note pad 188 on the center ring 186, an inner note pad 189 on the inner ring 185, and two outer note pads 190,191 on the outer ring 184. These four note pads 188-191 are related as octaves, i.e., one sector 187 contains $B^b{}_4$ and $B^b{}_5$ in the outer ring 184, $B^b{}_6$ in the inner ring 185, and $B^b{}_7$ in the center ring 186.

The double soprano pan set 180 provides an improvement in tonal range over, for example, the low tenor steel pan, with a range of $C_4$-$F_6$. This increase in tonal range is achievable without loss in sound quality because each pan in the double soprano pan set 180 has five fewer notes than the low tenor pan 10 of equal dimensions, allowing more surface area to be allocated to notes in the higher tonal ranges, for example, $C_7$-$B_7$.

A tablature system for use with this set 180 can be applied in two ways, similar to those described above for the low tenor pan, each method chromatic. In a first method, the top line would be used to represent the chromatic range $C_4$ through $B_5$; the middle line, $C_5$ through $B_6$; and the bottom line, $C_7$ through $B_7$. In a second method, the order is reversed, with the bottom line used to represent the chromatic range $C_4$ through $B_5$; the middle line, $C_5$ through $B_5$; and the top line, $C_7$ through $B_7$. A corresponding virtual MIDI keyboard representation 181 (FIG. 13) and mask 182 can be used for the double soprano pan set 180.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An electronic tool for assisting in teaching music to a player of a steel drum comprising:

a processor;

a display in electronic communication with the processor;

software resident on the processor comprising a code segment adapted for displaying on the display an image of a substantially circular base divided into twelve radial sectors, a central sector, and three concentric, radially spaced rings, thereby having 37 elements, each element bearing an indicium representative of a unitary, distinct note name in a range of three consecutive octaves plus a first note in a fourth consecutive octave, each ring arranged so that an adjacent note name in a first radial direction is separated by an interval of a fifth and an adjacent note name in a second radial direction opposite the first radial direction is separated by an interval of a fourth.

2. The electronic tool recited in claim 1, wherein the central sector indicium comprises a highest note in the range.

3. The electronic tool recited in claim 2, wherein the central sector indicium comprises $C_7$.

4. The electronic tool recited in claim 1, wherein radially adjacent note names comprise a same note letter indicator plus a different numerical octave indicator, and wherein adjacent numerical octave indicators differ by 1, a lowest octave represented in an outermost of the three rings.

5. The electronic tool recited in claim 4, further comprising twelve indicia positioned external a periphery of the base, each indicium adjacent an element of an outermost of the three rings, for indicating a relative minor key of a key represented by a note name in the adjacent element.

6. The electronic tool recited in claim 4, further comprising twelve indicia positioned external a periphery of the base, each indicium adjacent an element of an outermost of the three rings, for indicating a set of accidentals in a key represented by a note name in the adjacent element.

7. The electronic tool recited in claim 4, further comprising twelve indicia positioned external a periphery of the base, each indicium adjacent an element of an outermost of the three rings, for indicating a number and type of accidentals in a key represented by a note name in the adjacent element.

8. The electronic tool recited in claim 1, wherein each of the note names is enclosed in an oval-shaped indicium.

* * * * *